United States Patent [19]

Chatterjee et al.

[11] Patent Number: 5,135,966
[45] Date of Patent: Aug. 4, 1992

[54] ENVIRONMENTALLY DEGRADABLE POLYMER COMPOSITION

[75] Inventors: Ananda M. Chatterjee; Joseph P. Salanitro, both of Houston, Tex.

[73] Assignee: Shell Oil Company, Houston, Tex.

[21] Appl. No.: 798,457

[22] Filed: Nov. 26, 1991

[51] Int. Cl.$^5$ .............................. C08F 8/06
[52] U.S. Cl. ............................ 523/126; 524/398; 525/190; 528/272
[58] Field of Search ............. 523/126; 524/398; 525/190; 528/272

[56] References Cited

U.S. PATENT DOCUMENTS

| | | | |
|---|---|---|---|
| 3,840,512 | 10/1974 | Brackman | 524/398 |
| 3,867,324 | 2/1975 | Clendinning et al. | 525/186 |
| 3,901,838 | 8/1975 | Clendinning et al. | 524/398 |
| 3,994,855 | 11/1976 | Boberg | 523/126 |
| 4,038,228 | 7/1977 | Taylor | 523/126 |
| 4,393,167 | 7/1983 | Holmes et al. | 525/190 |
| 4,495,311 | 1/1985 | Hudgin et al. | 523/126 |
| 4,931,488 | 6/1990 | Chiquet | 523/126 |
| 5,096,941 | 3/1992 | Harnden | 524/398 |

Primary Examiner—Paul R. Michl
Assistant Examiner—Olga Asinovsky

[57] ABSTRACT

Blends of polypropylene, poly(3-hydroxybutyrate) or poly(3-hydroxybutyrate-3-hydroxyvalerate) and metal stearates are both photodegradable and biodegradable.

10 Claims, No Drawings

ENVIRONMENTALLY DEGRADABLE POLYMER COMPOSITION

FIELD OF THE INVENTION

This invention relates to polymer compositions which are both biodegradable and photodegradable. More particularly, it relates to blends of polypropylene, poly(3-hydroxybutyrate) or poly(3-hydroxybutyrate-3-hydroxyvalerate) and metal stearates. The blends can be used for the production of disposable articles of commerce.

BACKGROUND OF THE INVENTION

The solid waste crisis in the United States has attracted the attention of scientific, legislative, business and environmental communities. Some state legislatures have banned or are considering banning non-degradable plastics for packing, garbage bags, etc. Landfills are closing in many parts of the country. A great pressure is mounting to reduce the volume of non degradable solid waste generated by Americans. Plastics account for about 7% by weight and 18% by volume of the municipal solid waste. Current trends indicate that recycling will gradually become a major part of the solution. Waste-to-energy incineration and degradable plastics are also being considered as part of the solution. It is believed that degradable plastics alone will not provide the complete solution to the solid waste crisis. However, in specific cases e.g. agricultural mulch, six-pack beverage container carriers, disposable diapers, etc. degradable plastics offer attractive route to mitigate this problem.

Degradable plastics can be of two types: photodegradable and biodegradable. Photodegradable plastics have a structure or contain additives which promote degradation (chain scission and/or crosslinking depending on the polymer type) induced by actinic or ultraviolet (UV) radiation from the sun. Biodegradation involves the breakdown or deterioration of the polymer by microorganisms, e.g. bacteria or fungi in soil, sewage etc.

Some biodegradable polymers are already being marketed. They include poly(3-hydroxybutyrate) or PHB and the random copolymer poly(3-hydroxybutyrate-3-hydroxyvalerate) or PHBV. However, this material is very expensive, about $15/lb. Commercial development is being impeded for this reason.

Polyolefins with starch additive have also been studied for biodegradability, but only one mechanism of degradation is provided. The starch itself decomposes above about 230° C., and so offers sever limitation in polymer melt processability. Other disadvantages include a sacrifice of physical properties and color, due to the presence of the starch. In state-of-the-art degradable polymers which contain additives, bio- and photodegradability inducing additives are utilized separately. A polymer/polymer blend, which takes advantage of bio- and photo-degradability as claimed herein, would have technological and commercial advantages.

SUMMARY OF THE INVENTION

The present invention is a cost-effective plastic composition of matter which deteriorates in the environment by a dual mechanism. After initial sunlight exposure (photodegradation) the blend will undergo biodeterioration after disposal in soil, sewage etc. Thus, in the present invention, both ultraviolet radiation and microorganisms are useful as agents. Blends of relatively inexpensive polypropylene, PHBV or PHB and a transition metal stearate will lower resin cost compared to PHBV or PHB alone. In particular, it has been discovered that PHBV/PP blends or PHB/PP blends containing a transition metal stearate have enhanced biodeterioration characteristics. Particularly desirable results were obtained when the blend was exposed to ultraviolet light, and then subjected to microbial attack.

DETAILED DESCRIPTION OF THE INVENTION

The polypropylene polymers which may be employed in the process of the present invention may include homo and copolymers. The propylene copolymers may be copolymers of propylene with ethylene.

The new polypropylene blends contain the random copolymer poly(3-hydroxybutyrate-3-hydroxyvalerate). The amount of hydroxyvalerate comonomer can vary from 0 to about 30% by weight. The higher hydroxyvalerate contents give a polymer which has a lower melting point and is consequently more easily processed. The hydroxyvalerate content is not critical and does not significantly affect the degradability of the polymer. However, lower hydroxyvalerate content polymers are generally higher melting and are difficult to process. Poly(3-hydroxybutyrate) (0% hydroxyvalerate) is also contemplated. The preferred range of hydroxyvalerate concentrations in the copolymer is between 15% and 25% by weight.

The transition metal stearate useful in the present blends is selected from the group consisting of ferric tristearate and cerium tristearate.

The above identified transition metal stearates cause photodegradation of polyolefins. However, it is important to note that there are some exceptions to the notion that all transition metal stearates cause photodegradation e.g., copper stearate actually enhances the photostability of polypropylene and high density polyethylene, see Osawa et al, Polymer Degradation and Stability, 11, 63 (1985).

The blends may be compounded using conventional blenders, e.g. extruders.

The novel polymer blends of this invention can be fabricated into commercially useful articles, e.g. film, fiber, blow-molded bottles, injection molded articles, etc. These articles will undergo photodegradation when exposed to sunlight and consequently would be substantially more susceptible to biodegradation after disposal in a landfill.

EXAMPLES

Polymer Blend and Sample Preparation

The PHBV copolymer used contained 19% hydroxyvalerate.

The composition in parts by weight of the blends tested was as follows:

TABLE I

| | BLEND COMPOSITION | | | | | |
|---|---|---|---|---|---|---|
| | Blend #1 | Blend #2 | Blend #3 | Blend #4 | Blend #5 | Blend #6 |
| PP homopolymer | 50 | 50 | 50 | 100 | 100 | 100 |
| PHBV | 50 | 50 | 50 | — | — | — |
| Ferric tristearate | — | 1 | — | — | 1 | — |
| Cerium | — | — | 1 | — | — | 1 |

TABLE I-continued

| | BLEND COMPOSITION | | | | | |
|---|---|---|---|---|---|---|
| | Blend #1 | Blend #2 | Blend #3 | Blend #4 | Blend #5 | Blend #6 |
| tristearate Ethanox 398 | 0.02 | 0.02 | 0.02 | 0.02 | 0.02 | 0.02 |

The additive-free isotactic polypropylene homopolymer is available from Shell Chemical Company and had a melt flow rate of 12 gm/10 minutes by ASTM D-1238 Condition L. The other additive concentrations are expressed as parts per 100 parts of the total polymer blend, which was 50:50 (by weight) PP/PHBV. Ethanox 398 is 2,2'-ethylidene bis (4,6-di-tertiary-butyl phenyl) fluorophosphonite, a melt processing stabilizer.

The polymer/additive blends were compounded using a Haake twin screw extruder, at 203° C. melt temperature and 300 RPM under nitrogen and pelletized. The pellets were compression molded into 10 mil thick plagues 2 inches ×2.5 inches in size.

The plaques were exposed to UV radiation for 0, 24, 48 or 96 hours in a Sunshine carbon arc Weather-ometer (Model XW-WR) at 68° C. Successive cycles of 102 minutes of UV light without water spray and 18 minutes of UV light with water spray were used. Other aging conditions followed U.S. Federal Test Method Standard No. 191 (Method 5804.1). The UV-exposed and control (non-exposed) samples were then tested for biodeterioration. The purpose was to simulate biodeterioration of a plastics articles which has been already UV-degraded by terrestrial sunlight.

Biodeterioration Tests

Duplicate test specimens were placed in 250 ml wide-mouth glass screw capped jars which contained 50 gm of garden topsoil (Houston) and 100 ml Rensink synthetic sewage nutrients. Soil cultures were incubated in a rotary shaker at 125 RPM and 55° C. for up to 8 weeks. At weekly intervals, cultures were allowed to settle, 25 ml fluid removed, and an equal amount of fresh nutrients added. Control plaques (not exposed to UV radiation) were incubated at 4° C. with autoclave sterilized (1 hour, 15 psig steam pressure) soil and nutrient solution containing 0.1% mercuric chloride (microbial respiration inhibitor) for a similar time period.

At two-week intervals plaques were examined visually for deterioration. If significant degradation was observed, the plaque and fragments were screened, washed and dried at 35° C. for two hours. The difference between initial and final dry weights was used to determine weight loss of plaques.

Results

The biodeterioration test results of plaques exposed to soil slurries at 55° C. for 4-8 weeks are provided in Table II. As shown in Table II, both PP/PHBV/metal stearate plaques and PP/metal stearate plaques that were exposed to UV radiation became brittle and could be easily crushed in the palm of the hand. The control blends (incubated at 4° C.), with or without exposure to UV radiation, showed no visual deterioration or weight changes in 8 weeks. Blends containing no metal stearate but exposed to 0-96 hours UV radiation followed by soil incubation showed weight losses of 5 to 9%. The weight loss varied from 12% to 19% for blends containing a UV degradant (ferric tristearate or cerium tristearate) for polypropylene that were incubated in soil but not irradiated. The exposure PP/PHBV/metal stearate blends to 24, 48 or 96 hours of carbon-arc UV radiation resulted in a marked increase in biodeterioration, as shown by weight losses of 30% or higher after soil incubation. In particular, three samples of the PP/PHBV/cerium stearate blend (see Blend #3 in Table II) showed weight losses of 30%, 38% and 40% after only 4 weeks. The weight losses were significantly higher than the actual 1% wt concentration of the metal stearate in the polymer composition.

In the absence of UV exposure, the presence of stearates, particularly cerium tristearate, enhanced the biodeterioration of the PHBV/PP blend. The effect of the stearate on biodeterioration is enhanced after UV exposure. Compared to polypropylene alone (Blend #4) or polypropylene in combination with metal stearate (Blends #5 and #6), the PP/PHBV/metal stearate blends exhibit a substantial increase in biodeterioration. A polymer composition with enhanced biodeterioration is thus provided. This is surprising since the metallic stearates used are normally associated with photodegradation only, and not biodegradation, and sometimes even with photostabilization.

TABLE II

Effect of Metallic Stearates On The Biodeterioration of PHBV/PP Blend

| Sample | Carbon Arc Weather Ometer Exposure (Hrs.) | Weight Loss (−) or Gain (+) After 8 Weeks (Percent) | Comments |
|---|---|---|---|
| Controls at 4° C. (all blends, with and without metal stearate)[a] | 0–96 | +0.6 | No change |
| Blend #1 (PP/PHBV without a stearate, 55° C.) | 0 | −8 | Discoloration and peeling |
| | 24 | −6 | Discoloration and peeling |
| | 48 | −9 | Discoloration and peeling |
| | 96 | −5 | Discoloration and peeling |
| Blend #2 (PP/PHBV with ferric tristearate, 55° C.) | 0 | −12 | Discoloration |
| | 24 | −26 | Discoloration, peeling |
| | 48 | −26 | Extensive fragmentation |
| | 96 | −30 | Extensive fragmentation |
| Blend #3 (PP/PHBV with cerium tristearate, 55° C.) | 0 | −19 | Discoloration, cracking, peeling |
| | 24 | −30[b] | Extensive fragmentation |
| | 48 | −38[b] | Extensive fragmentation |
| | 96 | −40[b] | Extensive fragmentation |
| Blend #4 (PP without a stearate, 55° C.) | 0–96 | −0.5 | No change |
| Blend #5 (PP with ferric tristearate, 55° C.) | 0 | −1 | No change |
| | 24 | −1 | No change |
| | 48 | −3 | No change |

TABLE II-continued

Effect of Metallic Stearates On The Biodeterioration of PHBV/PP Blend

| Sample | Carbon Arc Weather Ometer Exposure (Hrs.) | Weight Loss (−) or Gain (+) After 8 Weeks (Percent) | Comments |
|---|---|---|---|
| Blend #6 (PP with cerium tristearate, 55° C.) | 96 | −2 | No change |
| | 0 | −7 | Brittle, broken into small pieces |
| | 24 | −13 | Brittle, broken into small pieces |
| | 48 | −4 | Brittle, broken into small pieces |
| | 96 | −4 | " |

Notes:
(a) Controls with or without UV radiation exposure
(b) Weight loss is after 4 weeks.

What is claimed is:

1. An environmentally degradable polymer blend comprising about 30% to about 90% wt of polypropylene, about 10% wt to about 70% wt poly(3-hydroxybutrate) or poly(3-hydroxybutrate-3-hydroxyvalerate) and from about 0.05% wt to about 5% wt of a transition metal stearate selected from the group consisting of ferric tristearate and cerium tristearate, wherein poly(3-hydroxybutrate-3-hydroxyvalerate) has a hydroxyvalerate comonomer content of up to about 30% wt.

2. The blend of claim 1 comprising about 35% wt to about 80% wt polypropylene and about 20% wt to about 65% wt poly(3-hydroxybutrate) or poly(3-hydroxybutrate-3-hydroxyvalerate).

3. The blend of claim 1 comprising about 40% wt to about 65% wt polypropylene and about 35% wt to about 60% wt poly(3-hydroxybutrate) or poly(3-hydroxybutrate-3-hydroxyvalerate).

4. The blend of claim 1 wherein the transition metal stearate is present at between 0.1% wt and about 3% wt.

5. The blend of claim 1 wherein the transition metal stearate is present at between 0.2% wt and about 2% wt.

6. The blend of claim 1 wherein the hydroxyvalerate content is between about 10% wt and 30% wt.

7. The blend of claim 1 wherein the hydroxyvalerate content is between about 15% wt and 25% wt.

8. The blend of claim 1 wherein the polypropylene is a copolymer of polypropylene and up to about 15% wt of an alpha olefin comonomer.

9. The blend of claim 6 wherein the comonomer is ethylene.

10. A degradable article produced from the blend of claim 1.

* * * * *